United States Patent
Xu et al.

(10) Patent No.: US 12,218,911 B2
(45) Date of Patent: Feb. 4, 2025

(54) SECURITY GUARANTEE METHOD AND APPARATUS FOR FULL LIFE CYCLE OF PACKET, AND DECENTRALIZED NETWORK TRUST SYSTEM

(71) Applicant: Tsinghua University, Beijing (CN)

(72) Inventors: Ke Xu, Beijing (CN); Bo Wu, Beijing (CN); Jianping Wu, Beijing (CN); Qi Li, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 486 days.

(21) Appl. No.: 17/490,435

(22) Filed: Sep. 30, 2021

(65) Prior Publication Data
US 2022/0038425 A1     Feb. 3, 2022

Related U.S. Application Data

(63) Continuation of application No. PCT/CN2020/134039, filed on Dec. 4, 2020.

(30) Foreign Application Priority Data

Apr. 24, 2020 (CN) .......................... 202010332302.4

(51) Int. Cl.
*H04L 9/30* (2006.01)
*H04L 9/40* (2022.01)

(52) U.S. Cl.
CPC ............ *H04L 63/0236* (2013.01); *H04L 9/30* (2013.01); *H04L 63/08* (2013.01); *H04L 63/1416* (2013.01); *H04L 63/1425* (2013.01)

(58) Field of Classification Search
CPC ....... H04L 63/0236; H04L 9/30; H04L 63/08; H04L 63/1416; H04L 63/1425;
(Continued)

(56) References Cited

U.S. PATENT DOCUMENTS

| 10,893,022 B1* | 1/2021 | Li | .......................... H04L 45/748 |
| 11,226,952 B2* | 1/2022 | Li | .............................. H04L 9/50 |
| 2021/0044976 A1* | 2/2021 | Avetisov | ................. G06F 21/64 |

FOREIGN PATENT DOCUMENTS

CN     111585984     8/2020

OTHER PUBLICATIONS

Xu et al., "Blockchain: New Vision for Security of Internet of Things," ZTE Technology Journal, Dec. 2018, vol. 24, No. 6, 5 pages.
(Continued)

*Primary Examiner* — Shin-Hon (Eric) Chen
*Assistant Examiner* — Vladimir I Gavrilenko
(74) *Attorney, Agent, or Firm* — Hodgson Russ LLP

(57) ABSTRACT

A security guarantee method and apparatus for a full life cycle of a packet are disclosed. The method includes: in response to a data packet generated at a communication source, performing by a distributed network node, authenticity verification on a source address and an identity of the data packet; in a network forwarding process of the data packet, performing by the distributed network node, collaborative sampling on the data packet and performing credibility verification on related routing behaviors; in response to the data packet reaching a destination end, verifying by the destination end, the legality of the data packet.

13 Claims, 4 Drawing Sheets

(58) Field of Classification Search
CPC ......... H04L 9/3247; H04L 9/50; H04L 63/12;
H04L 9/3239; H04L 63/083; H04L 63/20;
H04L 67/10
See application file for complete search history.

(56) References Cited

OTHER PUBLICATIONS

CNIPA, First Office Action for CN Application No. 202010332302.4, Dec. 14, 2020.
WIPO, International Search Report and Written Opinion for PCT/CN2020/134039, Mar. 1, 2021.

* cited by examiner

SECURITY GUARANTEE METHOD AND APPARATUS FOR FULL LIFE CYCLE OF PACKET, AND DECENTRALIZED NETWORK TRUST SYSTEM

CROSS REFERENCE TO RELATED APPLICATIONS

This application is a continuation application of International Application No. PCT/CN2020/134039 filed on Dec. 4, 2020 which claims priority to Chinese Patent Application No. 202010332302.4 filed on Apr. 24, 2020, the entire contents of which are incorporated by reference herein.

TECHNICAL FIELD

The disclosure relates to the field of network security technology, and in particular relates to a security guarantee method and apparatus for a full life cycle of packets, and a decentralized network trust system.

BACKGROUND

In recent years, network security has gradually become an important part of national security, and the sentence "if there is no network security, there is no national security" is sufficient to reflect the importance of network security. Even so, network attacks incidents still occur every second. The reason lies in the lack of safe and credible thinking at the beginning of designing the network system. For example, if the source address of a packet is maliciously modified, some attacks (e.g., a distributed denial of service DDoS attack) might occur; if the forwarding path of traffic flow is hijacked, the user privacy might been leaked. As a result, existing Internet systems are very vulnerable to network attacks.

SUMMARY

According to a first aspect of the disclosure, a security guarantee method for a full life cycle of a data packet is applicable to a decentralized network trust system (DNTS) created by global network nodes for a plurality of autonomous domains (AS) in a form of a blockchain. The method includes: in response to the data packet generated at a communication source, performing authenticity verification on a source address and an identity of the data packet. The performing step includes: sampling by a network node $N_i$, a source address src and an network identity NetID in the data packet, verifying by the network node $N_i$, the source address and a forwarding path with a public key of the communication source or a symmetric key shared between the communication source and the network node $N_i$, and uploading the src and the NetID in a form of a network status to a global network node $Node_j$; verifying by the global network node $Node_j$, a signature in the network status with a public key of the network node $N_i$ or a marking in the network status with a symmetric key shared between the global network node $Node_j$ and the network node $N_i$, continuing to broadcast the network status to the remaining global network nodes in response to the signature being correct and discarding the network status in response to the signature being wrong; and recording by the global network node $Node_j$, the network status in the DNTS through a consensus algorithm, and determining the authenticity of the src in the network status by querying a set of address prefixes of an AS to which the global network node $Node_j$ belongs; in a network forwarding process of the data packet, performing collaborative sampling and detection on the data packet and performing credibility verification on related routing behaviors, includes: sampling by the network node $N_i$, information of the data packet and related routing behaviors of adjacent network nodes, in which the related routing behaviors include one or more of discarding a message, tampering a message, and illegally modifying a forwarding path of a message; and in response to the data packet reaching a destination end, verifying the legality of the data packet.

According to a second aspect of the disclosure, a security guarantee apparatus for a full life cycle of a packet is applicable to a decentralized network trust system (DNTS) created by global network nodes for a plurality of autonomous domains (AS) in a form of a blockchain. The apparatus includes a processor and a memory having instructions stored thereon and executable by the processor. When the instructions are executed by the processor, the processor is configured to: perform authenticity verification on a source address and an identity of the data packet in response to the data packet generated at a communication source; in a network forwarding process of the data packet, perform collaborative sampling and detection on the data packet and perform credibility verification on related routing behaviors; and verify the legality of the data packet in response to the data packet reaching a destination end. The step of performing authenticity verification includes: sampling by the network node $N_i$, a source address src and an network identity NetID in the data packet, verifying by the network node $N_i$, the source address and a forwarding path with a public key of the communication source or a symmetric key shared between the communication source and the network node $N_i$, and uploading the src and the NetID in a form of a network status to the global network nodes $Node_j$, verifying by the global network node $Node_j$, a signature with a public key of the network node $N_i$ or a marking in the network status with a symmetric key shared between the global network node $Node_j$ and the network node $N_i$, continuing to broadcast the network status to the remaining global network nodes in response to the signature being correct, discarding the network status in response to the signature being wrong, and recording by the global network node $Node_j$, the network status in the DNTS through a consensus algorithm, and determining the authenticity of the src in the network status by querying a set of address prefixes of an AS to which the global network node $Node_j$ belongs. The steps of performing collaborative sampling and performing credibility verification include: sampling by the network node information of the data packet and related routing behaviors of adjacent network nodes. The related routing behaviors include one or more of discarding a message, tampering a message, and illegally modifying a forwarding path of a message.

According to a third aspect of the disclosure, a decentralized network trust system (DNTS) includes: a plurality of autonomous domains (AS), a network node $N_i$, a global network nodes $Node_j$, a communication source end and a destination end. Each of the ASs have a plurality of global network nodes $Node_j$. The network node $N_i$ may be configured to verify the source address and a forwarding path with a public key of the communication source or a symmetric key shared between the communication source and the network node $N_i$, sample a source address src and an network identity NetID in the data packet, and upload the src and the NetID in a form of a network status to the global network node $Node_j$. The global network node $Node_j$ may be configured to verify a signature in the network status with a public key of the network node $N_i$ or a marking in the network status with a symmetric key shared between the global network node $Node_i$ and the network node $N_i$, continue to broadcast the network status to the remaining global network nodes in response to the signature being correct and discard the network status in response to the signature being wrong. The global network nodes $Node_i$ may be further configured to record the network status in the DNTS through a consensus algorithm, and determine the authenticity of the src in the network status by querying a set of address prefixes of an AS to which the global network node Nodei belongs. The network node $N_i$ may be further configured to sample information of the data packet and related routing behaviors of adjacent network nodes, in which the related routing behaviors include one or more of discarding a message, tampering a message, and illegally modifying a forwarding path of a message. The communication source end may be configured to generate a data packet. The destination end may be configured to verify the legality of the data packet.

The additional aspects and advantages of the disclosure will be partly given in the following description, and some will become obvious from the following description, or be understood through the practice of the disclosure.

BRIEF DESCRIPTION OF THE DRAWINGS

The above and/or additional aspects and advantages of the disclosure will become obvious and easy to understand from the following description of the embodiments in conjunction with the accompanying drawings, in which.

DETAILED DESCRIPTION

Figure 1:
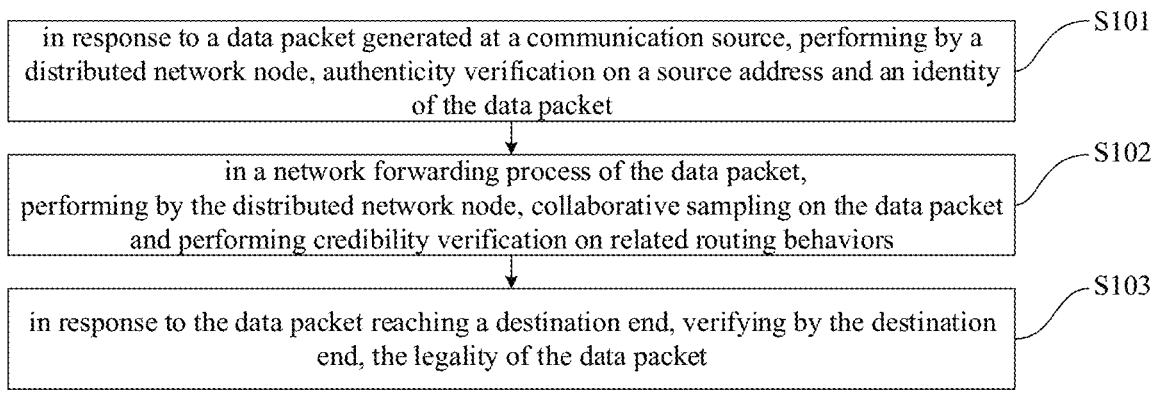
FIG. 1 is a flowchart illustrating a security guarantee method for a full life cycle of a data packet according to an embodiment of the disclosure.

Embodiments of the disclosure are described in detail below, examples of which are shown in the accompanying drawings, in which the same or similar reference numerals indicate the same or similar elements or elements with the same or similar functions. The embodiments described below with reference to the accompanying drawings are exemplary, and are intended to explain the disclosure, but should not be construed as limiting the disclosure.

From the perspective of the stage where data packets are located, current network attacks mainly occur at three processes of the network communication system. Firstly, in the generating process at the communication source end, it is very difficult to guarantee the authenticity of data packets, e.g., a malicious source can launch attacks such as source address spoofing, fake identity, etc., which affects the authenticity of entire communication process. Secondly, in the midway forwarding process, not only the packet content of data packets is vulnerable to malicious tampering, packet loss and redirection, but also the forwarding path is vulnerable to malicious hijacking and modifying, which affects the quality of network communication. Thirdly, in the receiving process at the destination end, the destination end lacks immune capacities such as identifying and filtering illegal data packets, leading to a decline in user experience and service quality. It may be seen that the network attacks run through the full life cycle of the packet packets, "source end generating, midway forwarding and destination end receiving".

The existing solutions mainly focus on a certain stage of the packet packets for the aforementioned network security threats. For example, SAVI technology mainly guarantees the security of true source addresses, OPT technology mainly verifies the security of the packet forwarding process, and PPV technology mainly improves the ability of the destination end to filter illegal data packets. These schemes do not consider the full life cycle of data packets, leading to an embarrassing situation where one thing is caught while another thing is lost or where it is impossible to defend effectively. At the same time, a security scheme based on centralized management and control (such as SDN technology) can easily achieve security verification and protection to the full life cycle of packets, but there are still problems such as single point of failure and misconfiguration, so that there are still major hidden hazards in this type of security scheme.

In the existing research technologies, a lot of researches on security mechanism are mainly carried out at a certain one of the three stages of packets, i.e., source end generating, midway forwarding, and destination end receiving, lacking of systematic thinking about the full life cycle of packets. This often leads to a situation where one thing is caught while another thing is lost or where it is impossible to defend effectively, and the security of network communications has not been substantially improved. In particular, the security of network communication is very difficult to be solved systematically. Many studies either verify "source end generating" a data packet, or detect "midway forwarding" the packet, or perform security filtering on "reception at the destination end", but not conduct security analysis from the perspective of the full life cycle "source end generating, midway forwarding and destination end receiving" of data packets. Due to the ubiquity of network attacks, the existing schemes are in an embarrassing situation where one thing is caught while another thing is lost or where it is impossible to defend effectively. Although centralized network management and control methods (such as SDN technology) may be used to monitor security states of the packet's full life cycle, it is mainly limited by hidden network hazards such as single point of failure.

By constructing a decentralized network trusted system among autonomous domains, the embodiments of the disclosure can verify the authenticity of the "source end generating" a data packet, can also perform security monitoring on the "midway forwarding" process of the packet and discover in time abnormal behaviors of network nodes, and at the same time for "reception at the destination end", can obtain abnormal records related to the packet by querying the decentralized network trusted system, so as to effectively filter illegal data packet packets. With decentralized information monitoring and intelligent detection technologies, the embodiments of the disclosure can completely get rid of single point of failure from a trusted third party, perform security guarantee on the full life cycle of data packets, and have advantages such as high flexibility, strong adaptability and robustness, ensuring the security and credibility of the entire network system while taking into account the computing calculation and storage costs.

The following describes a decentralized security guarantee method and apparatus for a full life cycle of a packet according to the embodiments of the disclosure with reference to the drawings. Firstly, a decentralized security guarantee method for a full life cycle of a packet will be described with reference to the drawings according to the embodiments of the disclosure.

FIG. 1 is a flowchart illustrating a security guarantee method for a full life cycle of a data packet according to an embodiment of the disclosure.

As illustrated in FIG. 1, the security guarantee method for the full life cycle of the packet includes the following steps.

In step S101, in response to a data packet generated at a communication source end, the authenticity of a source address and an identity of the data packet is verified by a distributed network node.

Figure 2:
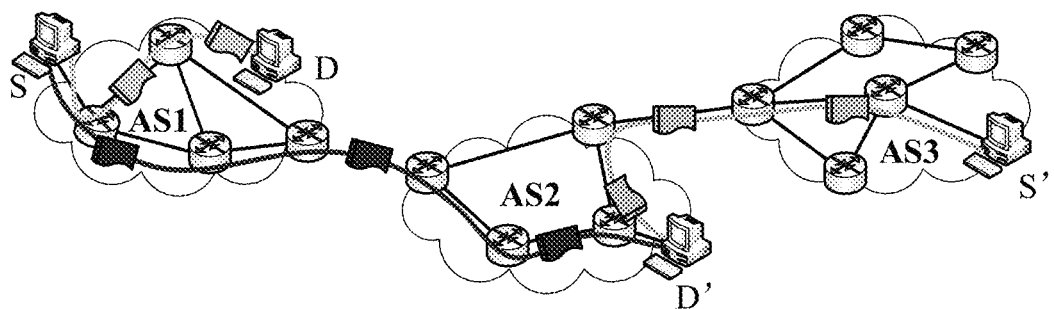
FIG. 2 is a schematic diagram illustrating a full life cycle of a data packet according to an embodiment of the disclosure.

It may be understood that, after the data packet is generated at the communication source end, the distributed network node verifies the authenticity of the source address and the identity of the packet. For example, as illustrated in FIG. 2, data packets in the first stage are generated at the communication source end. The communication source ends S and S' in FIG. 2 respectively generate data packets and send them to the destination ends D and D'.

It should be noted that, $n_m$ network nodes $Node_i$ ($1 \le i \le n_m$) that can participate in creating a DNTS are contained in an autonomous domain $AS_m$. The network node may be a switch, a router, or a server separately configured. In the embodiment of the disclosure, these network nodes are called global network nodes.

Each middle network node (e.g., $N_i$) in the network communication scenario contains a pair of public key and private key. The private key is used for signatures to ensure the authenticity of information, and the public key is used for encryption to ensure the integrity of information. In some embodiments, there are symmetric keys shared between the communication source and each middle network node, and the symmetric keys are used to verify the source address and forwarding paths. In some embodiments, there are symmetric keys shared between each global network node and each middle network node, and the symmetric keys are used to verify a marking in the network status.

In an embodiment of the disclosure, the method further includes: creating the decentralized network trust system through direct or indirect connections of the global network nodes in the plurality of autonomous domains in the network.

Figure 3:
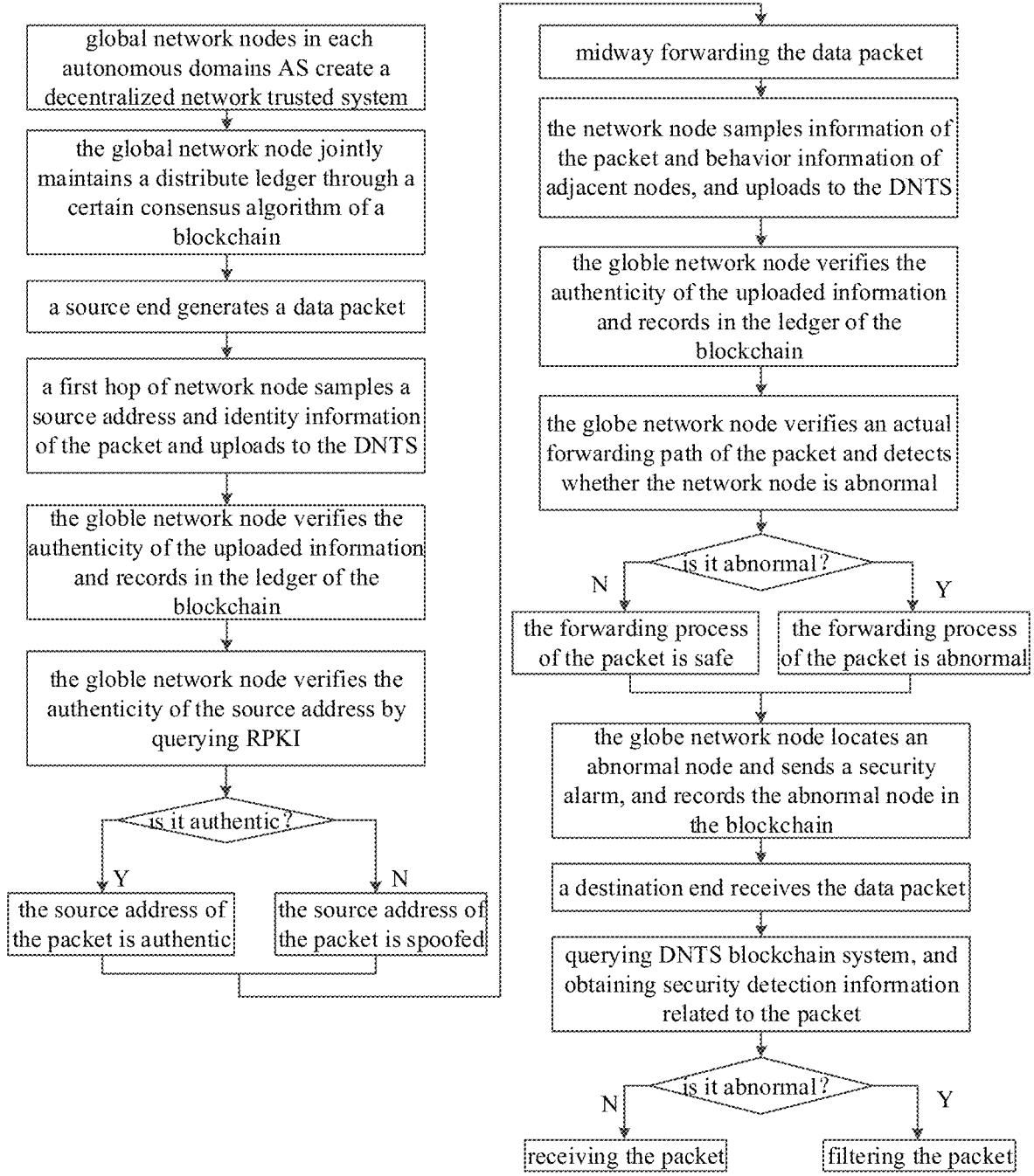
FIG. 3 is a flowchart illustrating a security guarantee method for a full life cycle of a data packet according to an embodiment of the disclosure.

It may be understood that, as illustrated in FIG. 3, the decentralized network trusted system (DNTS) is created through the direct or indirect connections of the global network nodes in multiple autonomous domains in the network. DNTS information is open and transparent, which may be queried and obtained by any network node. The trusted system is maintained jointly by the global network nodes $Node_i$ through a certain consensus algorithm. Therefore, DNTS may be expressed as:

$$DNTS=\{Node_1, Node_2, Node_3, \ldots, Node_n\}$$

where n is a number of global nodes in the DNTS. DNTS has the following three functions:

(1) The trusted system can obtain public network resources or service information (information such as AS address prefixes, border gateway protocol (BGP) path announcements, etc.) by accessing existing network basic services (such as a resource public key infrastructure (RPM) and a BGP);

(2) The trusted system can receive and record various network status information (such as a number of packets, a source address, a network identity, a forwarding path, a hash value, etc.) uploaded by a network node $N_i$; and (3) The global network node $Node_i$ in the trusted system can intelligently detect and monitor network behaviors in the network system according to the above-mentioned network status information.

Figure 4:
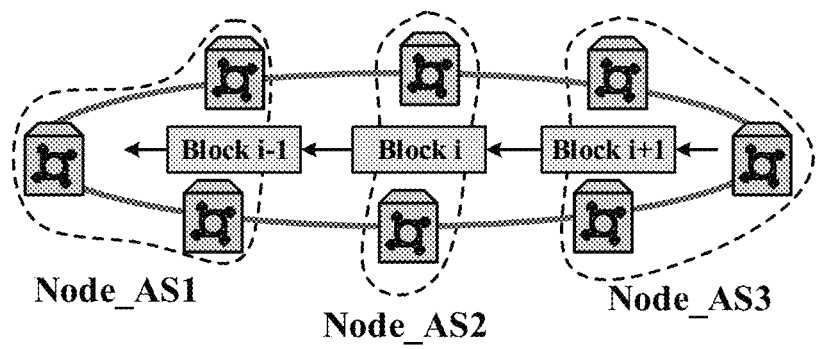
FIG. 4 is an architecture diagram illustrating a decentralized network trusted system (DNTS) according to an embodiment of the disclosure.

Specifically, as illustrated in FIG. 4, constituent elements and organizational structure of the DNTS architecture mainly include S11-S13.

S11, each autonomous domain AS has one or more network nodes $Node_i$ that participate in constituting the trusted system of the global network. In the disclosure, such nodes are called as global network nodes. As illustrated in FIG. 4, Node_AS1 represents a set of global network nodes in the AS1. Node_AS2 represents a set of global network nodes in the AS2. Node_AS3 represents a set of global network nodes in the AS3. The number of global network nodes in these three ASs are respectively 3, 2, and 3.

S12, these global network nodes constitute a decentralized network trusted system (DNTS) through direct or indirect connections. The DNTS in FIG. 4 is composed of 8 global network nodes $Node_i$ in a form of a blockchain. These nodes $Node_i$ jointly maintain DNTS database (or ledger) through a consensus algorithm. $Block_{i-1}$, $Block_i$, and $Block_{i+1}$ in FIG. 4 respectively represent three blocks in the blockchain connected in sequence.

S13, the global network node $Node_i$ in the DNTS has the following functions: firstly, it can access related public network resources or services, such as a resource public key infrastructure (RPKI) and a border gateway protocol (BGP), so as to obtain public information such as an address space of each AS and BGP path announcements; secondly, it can receive information (such as the sampled information of packets) uploaded from the nodes in the network; thirdly, it can intelligently detect network behaviors based on the information recorded in the blockchain, and locate related abnormal network nodes.

Further, in an embodiment of the disclosure, performing by the distributed network node, authenticity verification on the source address and the identity of the data packet includes: sampling by the network node $N_i$, a source address src and/or an network identity NetID and/or an encrypted identifier embedded in a message in the data packet, and uploading to the global network node $Node_i$ in a form of a network status NetStatus.

It should be noted that, the authenticity verification of the source address/identity of the message in the embodiment of the disclosure is not only limited to sampling the existing fields in the message (such as the source address src), but may also sample the encrypted identifier embedded in a message at the source end.

Specifically, as illustrated in FIG. 3, when a data packet is generated at the source end S and enters the network, the network node $N_i$ may sample the source address src and the network identity NetID (if any) in the data packet, and upload the src and the NetID in a form of network status NetStatus to the global network node $Node_i$. The NetStatus may be expressed as:

NetStatus={src,NetID,Signi(src||NetID)}, where Signi(src||NetID) represents a signature obtained by the network node $N_i$ using its private key and splicing (symbol "||" means splicing) src and NetID as an input.

The $Node_i$ first uses $N_i$'s public key to verify the signature Signi(src||NetID) after receiving the NetStatus. If the signature is correct, the NetStatus may continue to be broadcast to all global network nodes; otherwise, the NetStatus may be discarded.

The global network node $Node_i$ records the received NetStatus in the DNTS through a consensus algorithm. At the same time, the $Node_i$ queries a set of AS's address prefixes ASAddPrefix to determine the authenticity of the src in the NetStatus: if src∈ASAddPrefix, it indicates the source address information src in the data packet is authentic and credible, otherwise, it indicates that the source address information in the data packet has been spoofed, so the global network node may locate the source end S where a source address spoofing attack occurs.

In step S102, the distributed network node performs collaborative sampling and detection on the data packet during a network forwarding process of the data packet, and performs credibility verification on related routing behaviors.

The related routing behaviors refer to one or more of discarding, tampering, and illegally modifying forwarding paths in the message.

It may be understood that, when the packet is in the network forwarding process, the distributed network node performs collaborative sampling and detection on the packet, and performs credibility verification on its related routing behaviors. For example, as illustrated in FIG. 2, in the second stage, data packets are forwarded in the network. In FIG. 2, the packets are forwarded in the network environment of autonomous domains AS1, AS1 and AS2, AS3 and AS2.

Further, in an embodiment of the disclosure, performing by the distributed network node collaborative sampling and detection on the data packet, and performing credibility verification on related routing behaviors includes: sampling by the network node $N_i$ information of the packet, and performing related sampling on behaviors of adjacent network nodes.

Specifically, as illustrated in FIG. 3, when the data packet is forwarded in the network, the network node $N_i$ may sample information (such as a source address src, a destination address dest, a source port number SrcPort, a destination port number DestPort, a protocol number Protocol and a number Num of such packets) of the packet. At the same time, the behaviors (such as a number InPktNum of input packets and a number OutPktNum of output packets) of adjacent network nodes are also sampled. The above two types of sampled results are respectively represented as SamplePkt and SampleNei, which are shown as follows:

SamplePkt={src,dest,SrcPort,DestPort,protocol,Num, $SignPkt_i$},

SampleNei={InPktNum,OutPktNum,$SignNei_i$}, where $SignPkt_i$ and $SignNei_i$ respectively represent signatures obtained by the network node $N_i$ using its private key, and the $SignPkt_i$ and $SignNei_i$ are respectively obtained with src||dest||SrcPort||DestPort||protocol||Num and InPktNum||OutPktNum as calculation inputs.

The network node $N_i$ uploads the above two types of sampled information to the global network node $Node_i$. After receiving the SamplePkt and SampleNei, the $Node_i$ first uses $N_i$'s public key to recalculate $SignPkt_i$ and $SignNei_i$. If the calculated values are consistent with the received values, the SamplePkt and SampleNei continue to be broadcast to all global network nodes; otherwise, the SamplePkt and SampleNei are discarded.

The global network node $Node_i$ records the received SamplePkt and SampleNei in the DNTS through a consensus algorithm. The $Node_i$ detects and verifies the credibility of the packet in the forwarding process based on the information in the received SamplePkt: the $Node_i$ may verify the source address of the packet based on src, dest, SrcPort, DestPort and protocol and may also restore and verify forwarding paths; the $Node_i$ determines whether there is a phenomenon such as malicious packet loss in data stream to which the packet belongs during the forwarding process based on the Num; the $Node_i$ monitors and diagnoses behaviors of the network nodes based on the received information in the SampleNei: the $Node_i$ determines whether there is a malicious packet loss phenomenon at a certain network node based on a sum of input packets and a sum of output packets of the network node.

The global network node $Node_i$ analyzes the sampled information (SamplePkt and SampleNei) recorded in the DNTS with artificial intelligence, so as to detect abnormalities in the network, such as source address spoofing, path tampering, packet discarding, etc. At the same time, the $Node_i$ may locate relevant malicious nodes based on the sampled information recorded in the DNTS, and record the malicious nodes or information of the autonomous domain in the DNTS. Since the DNTS information is open and transparent, any administrator or even network node can query the malicious node or abnormal behaviors, and safely adjust related network policies based on the query results.

DNTS automatically sends a security alarm WARNING caused by abnormal network behaviors to various network nodes or key nodes through smart contracts. The composition of WARNING is shown as follows:

WARNING={NodeAdd,ASN,ExceptionType}.

where NodeAdd represents an address of an abnormal network node, ASN represents an autonomous domain number of the abnormal network node, ExceptionType represents an abnormal type, such as, source address spoofing (Spoofing), path tampering (Inconsistency), packet loss (dropping), redirection (Redirection), data tampering (Modification), etc.

After receiving the security alarm WARNING, the network node $N_i$ will focus on the security alarms of adjacent network nodes or autonomous domains, and can automatically evade these malicious nodes or autonomous domains during the forwarding process of packets, so as to realize safe routing and forwarding of packets.

In step S103, after the data packet reaches a destination end, the legality of the data packet is verified and filtered by the destination end.

It may be understood that after the data packet reaches the destination end, the destination end verifies and filters the legality of the packet. For example, as illustrated in FIG. 2, in the third stage, the data packet reaches the destination ends D and D' after a series of forwarding.

Further, in an embodiment of the disclosure, verifying and filtering by the destination end the legality of the data packet includes: when the destination end receives the data packet, determining a security degree of the packet by querying whether behaviors of the source end and network nodes along the way in the decentralized network trust system are abnormal.

Specifically, as illustrated in FIG. 3, when the destination end receives the data packet, the decentralized network trusted system (DNTS) may be queried about whether the behaviors of the source end and the network nodes along the way are abnormal, so as to determine the security degree of the packet by: the destination end may filter the packet and data stream when the communication source end is detected to have source address spoofing, otherwise the packet and data stream may be received; the packet may be filtered when the packet forwarding path is abnormal, otherwise the packet and data stream may be received.

The destination end reads quintuple information from the received packet, namely the source address src, the destination address dest, the source port number SrcPort, the destination port number DestPort, the protocol number protocol, and queries the authenticity of the communication source end related to the quintuple information in the DNTS. When the DNTS records that the source address spoofing occurs at the source end related to the packet, the destination end filters the packet and the data stream to which the packet belongs.

Based on the above quintuple information, the destination end may obtain an actual path PATHactual of the packet forwarded in the network from the DNTS; at the same time, the destination may also obtain a desired path PATHdesired of the packet from the DNTS, in which the PATHdesired may be a BGP announcement path (AS_PATH) where a basic unit is AS, may also be a path where a basic unit is a network node. When PATHactual is equal to PATHdesired, it indicates that the actual forwarding path of the packet is consistent with the desired forwarding path, and the destination end receives the packet and data stream; when PATHactual is not equal to PATHdesired, it indicates that the actual forwarding path of the packet is inconsistent with the desired forwarding path and a traffic hijacking attack may occur, and the destination end filters the packet and the data stream.

Figure 5:
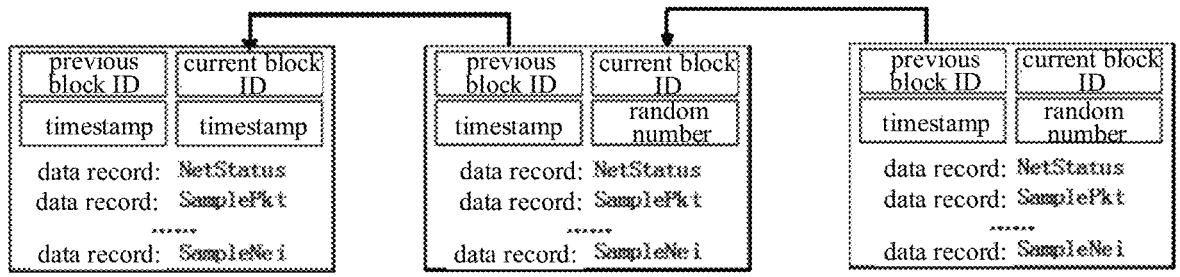
FIG. 5 is a schematic diagram of a DNST blockchain structure according to an embodiment of the disclosure.

It should be noted that, as illustrated in FIG. 5, a lot of data records are recorded in each block of the DNST blockchain structure of the disclosure. These data records may be one of the network status NetStatus, the sampled information SamplePkt and SampleNei. When these data records are recorded in the blockchain, anyone can access them but cannot modify them.

Figure 6:
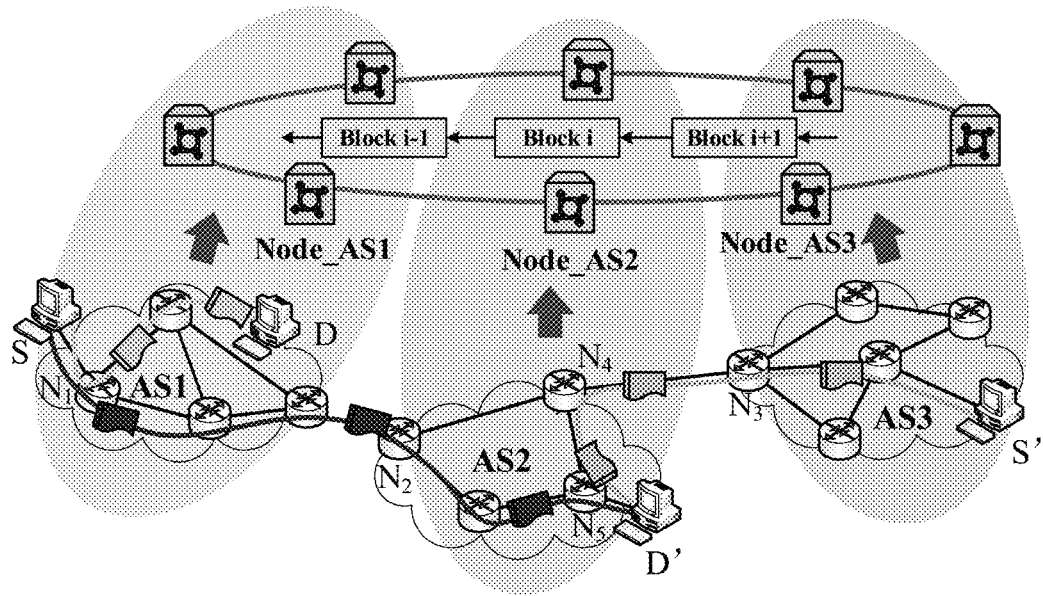
FIG. 6 is an architecture diagram illustrating a DNTS according to a specific embodiment of the disclosure.

The decentralized security guarantee method for the full life cycle of the packet will be further elaborated below through specific embodiments. As illustrated in FIG. 6, the details are as follows.

S21, when a data packet is generated from the source end S (such as its address is 192.168.0.1) in FIG. 6 and enters the network environment, a first hop of network node $N_1$ may sample the source address src and the network identity NetID in the packet (if any), and upload the sampled information and its own digital signature to the global network node $Node_i$ in a form of network status NetStatus, in which $Node_i \in Node\_AS1$, its own digital signature Signi(src||NetID) is calculated by the network node $N_1$ from its own private key with a splicing of the src and the NetID as inputs.

NetStatus={src,NetID,Signi(src||NetID)}.

S22, the global network node $Node_i$ verifies the authenticity of the digital signature with a public key of the network node $N_1$ after receiving the NetStatus. If it is authentic, the NetStatus continues to be broadcast to the remaining global network nodes; otherwise, the NetStatus is discarded.

S23, the global network node records the NetStatus in the DNTS blockchain with a consensus algorithm, and queries RPKI to obtain a range of address prefixes ASAddPrefix (such as 192.168.0.0~192.172.0.0) of an autonomous domain AS where the data packet is originated. If src∈ASAddPrefix (e.g., the src is 192.168.0.1), it indicates that the source address of the packet is authentic, otherwise (e.g., the src is 192.180.0.1), it indicates that a source address spoofing attack has occurred. At this time, the communication source end is located and recorded in the DNTS blockchain ledger.

S31, when a data packet leaves the source end S and is forwarded in the network, the network nodes $N_j$ along the forwarding path may sample packet information (such as a source address src, a destination address dest, a source port number SrcPort, a destination port number DestPort, a protocol number Protocol and a number Num of such packets), and upload the sampled information and a digital signature generated by its own private key to the global network node $Node_i$ through the message SamplePkt. The structure of SamplePkt is shown as follows:

SamplePkt={src,dest,SrcPort,DestPort,protocol,Num, SignPkt$_j$}.

S32, after receiving the SamplePkt, the global network node $Node_i$ first verifies the authenticity of the digital signature with a public key of the network node $N_j$. If it is authentic, the SamplePkt continues to be broadcast to the remaining global network nodes; otherwise, the SamplePkt is discarded.

S33, the global network node records the SamplePkt in the DNTS blockchain with a consensus algorithm, and restores the actual forwarding path PATHactual of the packet through the quintuple src, dest, SrcPort, DestPort, and protocol. At the same time, the global network node obtains the desiredforwarding path PATHdesired of the packet (such as AS_PATH in the BGP announcement) through querying, and compares the consistency of PATHactual and PATHdesired to determine whether there is a problem of inconsistent forwarding paths in the midway forwarding process of the packet. That is, when PATHactual is equal to PATHdesired, it indicates that the packet does no suffer from the traffic hijacking attack during the midway forwarding process; and when PATHactual is not equal to PATHdesired, it indicates that the packet has suffered from the traffic hijacking attack during the midway forwarding process.

S34, when the data packet is forwarded in the network, the network node $N_j$ along the way may sample behaviors of adjacent network nodes (such as a number of input packets InPktNum and a number of output packets OutPktNum), and upload the sampled information and a digital signature generated by its own private key to the global network node $Node_i$ through the message SampleNei. The structure of SampleNei is shown as follows:

SampleNei={InPktNum,OutPktNum,SignNei$_j$}.

S35, the global network node $Node_i$ verifies the authenticity of the digital signature with the public key of the network node $N_j$ after receiving the SampleNei. If it is authentic, the SampleNei continues to be broadcast to the remaining global network nodes; otherwise, the SampleNei is discarded.

S36, the global network node records the SampleNei in the DNTS blockchain with a consensus algorithm, and judges whether there is malicious packet loss during the packet forwarding process through the InPktNum and OutPktNum information in the SampleNei of adjacent network nodes. As illustrated in FIG. 6, the number of packets sent by the network node $N_2$ to $N_4$ is $OutPktNum_{24}$, the number of packets sent by the network node $N_5$ to $N_4$ is $OutPktNum_{54}$, the number of packets received by $N_3$ from $N_4$ is $InPktNum_{43}$. If $OutPktNum_{24}+OutPktNum_{54}\ll InPktNum_{43}$, it indicates that a serious packet loss phenomenon occurs at the network node $N_4$. For example, if the number of packets sent by the network nodes $N_2$ and $N_5$ to $N_4$ are respectively 100 and 80, and the number of packets received by $N_3$ from $N_4$ is 50, it indicates that serious packet loss occurs at the network node $N_4$.

S37, the global network node $Node_i$ analyzes the sampled information SamplePkt and SampleNei recorded in the DNTS with artificial intelligence to detect abnormalities present in the network, such as source address spoofing, path tampering, packet discarding, etc. At the same time, the $Node_i$ can locate relevant malicious nodes based on the sampled information recorded in the DNTS. For example, the malicious network node $N_4$ is located when $OutPktNum_{24}+OutPktNum_{54}\ll InPktNum_{43}$ in S36, information on the malicious node and the autonomous domain AS2 are recorded in the DNTS. Since the DNTS information is open and transparent, any administrator or even network node can query about the malicious node or abnormal behaviors, and safely adjust relevant network strategies according to the query result.

S38, the DNTS automatically sends a security alarm WARNING caused by the abnormal network behaviors to each network node or key node in a form of smart contract. The composition of WARNING is shown as follows:

WARNING={$N_4$,AS2,Dropping},

After receiving the security alarm WARNING the network node $N_i$ may focus on the security alarms of adjacent network nodes or autonomous domains, and can automatically evade these malicious nodes or autonomous domains during the packet forwarding process, so as to realize safe routing and forwarding of packets.

4.1, when the data packet reaches the destination end, the destination end can query a DNTS blockchain system about whether behaviors of the source end and network nodes along the way are abnormal, further to judge a security degree of the packet. That is, the destination end reads quintuple information from the received packet, i.e., a source address src, a destination address dest, a source port number SrcPort, a destination port number DestPort, and a protocol number protocol, and queries the authenticity of the communication source end related to the quintuple information in the DNTS. When the DNTS records that when a source address spoofing occurs at the source end related to the packet, the destination end filters the packet and the data stream to which the packet belongs.

4.2, the destination end may obtain an actual path PATHactual of the packet forwarded in the network from the DNTS based on the above quintuple information. At the same time, the destination end may also obtain a desired path PATHdesired of the packet from the DNTS, in which the PATHdesired may be a BGP announcement path (AS_PATH) where a basic unit is AS, may also be a path where a basic unit is a network node. When PATHactual is equal to PATHdesired, it indicates that the actual forwarding path of the packet is consistent with the desired forwarding path, and the destination end receives the packet and data stream; when PATHactual is not equal to PATHdesired, it indicates that the actual forwarding path of the packet is inconsistent with the desired forwarding path and a traffic hijacking attack may occur, and the destination end filters the packet and the data stream.

In summary, the embodiments of the disclosure connects the decentralized global trusted system created by multiple network nodes among different autonomous domains. The decentralized trusted system has the capabilities of information monitoring and intelligent detection, and may provide security guarantee for the credibility of the data packet's full life cycle. Specifically, when the data packet is generated at the source end and just enters the network, the distributed network node can verify the authenticity of the source address and the identity of the packet, and filter the data packets with the source address spoofing and fake identities; when the data packets are forwarded in the network, the distributed network nodes may sample, monitor and verify the packets, and detect malicious behaviors such as packet discarding, tampering, redirection, and path modifying; when the data packets reach the destination end, the destination end can effectively verify and filter the packet according to the decentralized trusted system. In this way, the problem is solved that the related art cannot realize the security guarantee of the data packet's full life cycle, "source end generating, midway forwarding and destination end receiving".

According to the embodiment of the disclosure, the decentralized security guarantee method for the full life cycle of the packet can provide security detection and guarantee technology for all the three stages of the packet (source end generating stage, midway forwarding stage and destination end receiving stage), effectively utilize distributed and collaborative information monitoring and intelligent detection, and completely get rid of the single point of failure caused by third-party security agencies. At the same time, the method has advantages such as high flexibility, strong adaptability, and robustness, guarantees the security and credibility of the entire network system in consideration of computation overheads and storage overheads.

Next, the decentralized security guarantee apparatus for the full life cycle of the packet according to the embodiment of the disclosure will be described with reference to the accompanying drawings.

Figure 7:
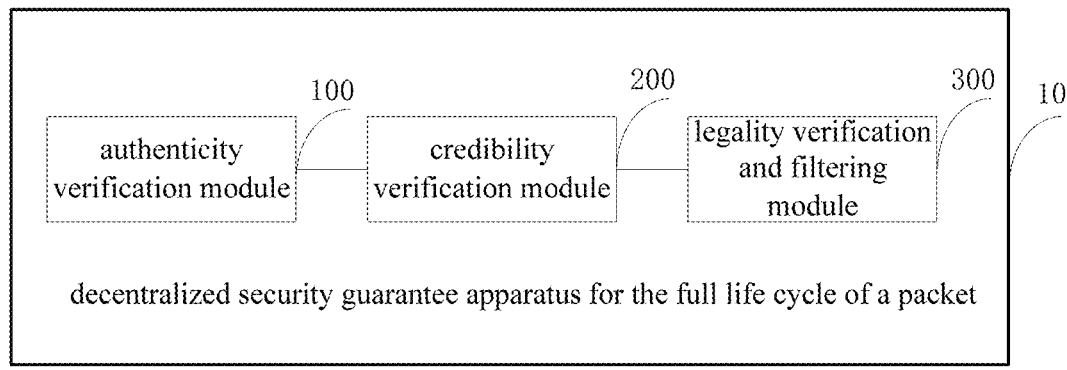
FIG. 7 is a structural schematic diagram of a security guarantee apparatus for a full life cycle of a data packet according to an embodiment of the disclosure.

FIG. 7 is a structural schematic diagram of a decentralized security guarantee apparatus for a full life cycle of a packet according to an embodiment of the disclosure.

As illustrated in FIG. 7, the decentralized security guarantee apparatus 10 for the full life cycle of the packet includes: an authenticity verification module 100, a credibility verification module 200, and a legality verification and filtering module 300.

The authenticity verification module 100 is configured to after a data packet is generated at a communication source, perform by a distributed network node, authenticity verification on a source address and an identity of the data packet. The credibility verification module 200 is configured to during a network forwarding process of the data packet, perform by the distributed network node, collaborative sampling and detection on the data packet and perform credibility verification on related routing behaviors. The legitimacy verification and filtering module 300 is configured to after the data packet reaches a destination end, verify and filter by the destination end, the legality of the data packet. The apparatus 10 of the embodiment of the disclosure has advantages such as high flexibility, strong adaptability, decentralization, robustness, etc., and improves the security and credibility of the entire network system while ensuring the feasibility.

Further, in an embodiment of the disclosure, the apparatus further includes: a creation module, configured to create the decentralized network trust system through direct or indirect connections of the global network nodes in the plurality of autonomous domains in the network.

Further, in an embodiment of the disclosure, the authenticity verification module 100 is further configured to sample by the network node $N_i$, the source address src and/or the network identity NetID in the data packet and/or an encrypted identifier embedded in the message, and upload to the global network node $Node_i$ in a form of a network status NetStatus.

Further, in an embodiment of the disclosure, the credibility verification module 200 is further configured to sample by the network node $N_i$, information of the packet and perform related sampling on behaviors of adjacent network nodes. The related routing behaviors include one or more of discarding a message, tampering a message, and illegally modifying a forwarding path of a message.

Further, in an embodiment of the disclosure, the legality verification and filtering module 300 is further configured to when the destination end receives the data packet, determine a security degree of the packet by querying whether behaviors of the source end and network nodes along the way in the decentralized network trusted system are abnormal.

It should be noted that the foregoing explanations from embodiments of the decentralized security guarantee method for the full life cycle of the packet are also applicable to embodiments of the decentralized security guarantee apparatus for the full life cycle of the packet, which will not be repeated here.

According to the embodiments of the disclosure, the decentralized security guarantee apparatus for the full life cycle of the packet can provide security detection and assurance technology for all the three stages of the packet (source end generating stage, midway forwarding stage and destination end receiving stage), effectively utilize distributed and collaborative information monitoring and intelligent detection, and completely get rid of the single point of failure caused by third-party security agencies. At the same time, the method has advantages such as high flexibility, strong adaptability, and robustness, guarantees the security and credibility of the entire network system in consideration of computation overheads and storage overheads.

Figure 8:
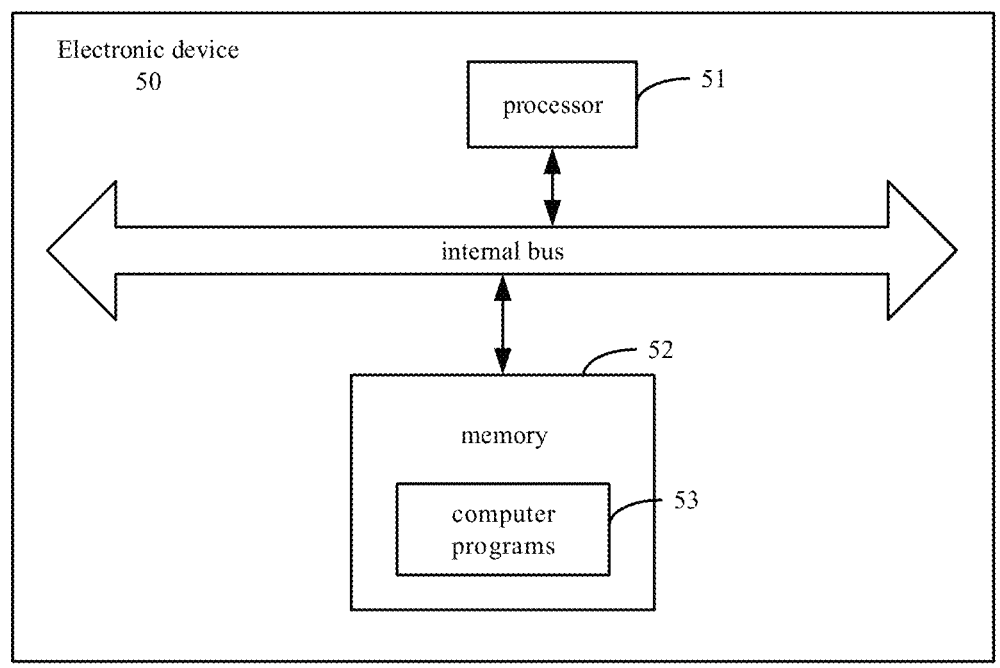
FIG. 8 is a structural schematic diagram of a security guarantee device 50 for a full life cycle of a data packet according to an embodiment of the disclosure.

FIG. 8 is a block diagram illustrating an electronic device 50 according to an example embodiment of the disclosure. The electronic device 50 includes a processor 51 and a memory 52. The memory 52 is configured to store executable instructions. The memory 52 includes computer programs 53. The processor 51 is configured to execute blocks of the above-mentioned method.

The processor 51 is configured to execute the computer programs 53 included in the memory 52. The processor 51 may be a central processing unit (CPU) or a general-purpose processor, a digital signal processor (DSP), an application specific integrated circuit (ASIC), a field-programmable gate array (FPGA), another programmable logic device, a discrete gate, a transistor logic device, a discrete hardware component, and the like. The general-purpose processor may be a microprocessor or any conventional processor.

The memory 52 is configured to store computer programs related to the method. The memory 52 may include at least one type of storage medium. The storage medium includes a flash memory, a hard disk, a multimedia card, a card-type memory (such as, a SD (secure digital) or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. The device may cooperate with a network storage device that performs a storage function of the memory by a network connection. The memory 52 may be an internal storage unit of the device 50, such as a hard disk or a memory of the device 50. The memory 52 may also be an external storage device of the device 50, such as a plug-in hard disk, a smart media card (SMC), a secure digital (SD) card, a flash card, disposed on the device 50. Further, the memory 52 may also include both the internal storage unit of the device 50 and the external storage device. The memory 52 is configured to store the computer program 53 and other programs and data required by the device. The memory 52 may also be configured to temporarily store data that has been output or will be output.

The various embodiments described herein may be implemented by using the computer readable medium such as computer software, hardware, or any combination thereof. For a hardware implementation, embodiments described herein may be implemented by using at least one of: an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. For a software implementation, an implementation such as a procedure or a function may be implemented with a separate software module that allows at least one function or operation to be performed. Software codes may be implemented by a software application (or program) written in any suitable programming language, and the software codes may be stored in the memory and executed by the controller.

The electronic device 50 includes, but is not limited to, a mobile terminal, an ultra-mobile personal computer device, a server, and other electronic device with a computing function. (1) The mobile terminal is characterized by having a function of mobile communication and aiming at providing a voice and data communication. Such mobile terminal includes a smart phone (such as iPhone), a multimedia phone, a functional phone, and a low-end phone. (2) The ultra-mobile personal computer device belongs to a category of personal computer, which has a computing and processing function, and generally has a feature of mobile Internet access. Such terminal includes a PDA (personal digital assistant), a MID (mobile Internet device) and a UMPC (ultra mobile personal computer) devices, such as an iPad. (3) The server provides a computing service. A composition of the server includes a processor, a hard disk, a memory, a system bus, etc. The server is similar to the general computer architecture, but because the server only provides a highly reliable service, it requires a higher processing capacity, stability, reliability, security, scalability and manageability. (4) Other electronic device with the computing function may include, but be not limited to, the processor 51 and the memory 52. It may be understood by the skilled in the art that, FIG. 3 is merely an example of the electronic device 50, and does not constitute a limitation of the electronic device 50. The electronic device 50 may include more or less components than illustrated, some combined components, or different components. For example, the electronic device may also include an input device, an output device, a network access device, a bus, a camera device, etc.

The implementation procedure of the functions of each unit in the above device may refer to the implementation procedure of the corresponding actions in the above method, which is not elaborated here.

In some embodiment, there is also provided a storage medium including instructions, such as the memory 52 including instructions. The above instructions may be executed by the processor 51 of the electronic device 50 to perform the above method. In some embodiments, the storage medium may be a non-transitory computer readable storage medium. For example, the non-transitory computer readable storage medium may include the ROM, the random-access memory (RAM), the CD-ROM (compact disc read-only memory), a magnetic tape, a floppy disk, optical data storage device, etc.

A non-transitory computer readable storage medium is provided. When instructions stored in the storage medium are executed by a processor of a terminal, the terminal is enabled to execute the above method for dispatching a power grid.

In some embodiments, there is also provided a computer program product including executable program codes. The program codes are configured to execute any of the above embodiments of the method when executed by the above device. In addition, the terms "first" and "second" are only used for descriptive purposes, and cannot be understood as indicating or implying relative importance or implicitly indicating a number of indicated technical features. Therefore, the features defined with the terms "first" and "second" may explicitly or implicitly include at least one of the features. In the description of the disclosure, "a plurality of" means at least two, such as two, three, etc., unless otherwise specifically defined.

In the disclosure, unless expressly stipulated and defined otherwise, the first feature "on" or "under" the second feature may be the first feature in direct contact with the second feature, or the first feature in indirect contact with the second feature through an intermediary. Moreover, the first feature "over", "above" and "up" the second feature may mean that the first feature is directly above or obliquely above the second feature, or it simply means that In the disclosure, unless expressly stipulated and defined otherwise, the first feature "on" or "under" the second feature may be the first feature in direct contact with the second feature, or the first feature in indirect contact with the second feature through an intermediary. Moreover, the first feature "over", "above" and "up" the second feature may mean that the first feature is directly above or obliquely above the second feature, or it simply means that the level of the first feature is higher than that of the second feature. The first feature "under", "below" and "down" the second feature may mean that the first feature is directly below or obliquely below the second feature, or it simply means that the level of the first feature is smaller than that of the second feature.

In the description of this specification, descriptions with reference to the terms "one embodiment", "some embodiments", "examples", "specific examples", or "some examples" etc. mean specific features, structures, materials, or characteristics described in conjunction with the embodiment or example are included in at least one embodiment or example of the disclosure. In this specification, schematic representations of the above terms do not necessarily refer to the same embodiment or example. Moreover, the described specific features, structures, materials or characteristics can be combined in any one or more embodiments or examples in a suitable manner. In addition, those skilled in the art can bind and combine the different embodiments or examples and the features of the different embodiments or examples described in this specification without contradicting each other.

Although the embodiments of the disclosure have been shown and described above, it can be understood that the above-mentioned embodiments are exemplary and should not be construed as limitations to the disclosure. Those skilled in the art can make changes, modifications, substitutions, and modifications to the above embodiments within the scope of the disclosure.

What is claimed is:

1. A security guarantee method for a full life cycle of a data packet, applicable to a decentralized network trust system (DNTS) created by global network nodes for a plurality of autonomous domains (ASs), the plurality of ASs are connected in a blockchain, comprising:

in response to the data packet generated at a communication source, performing authenticity verification on a source address and an identity of the data packet, comprising:

sampling by a network node $N_i$, a source address src and a network identity NetID in the data packet, verifying by the network node $N_i$, the source address and a forwarding path with a public key of the communication source or a symmetric key shared between the communication source and the network node $N_i$, and uploading a network status to a global network node $Node_i$, wherein the network status is expressed as NetStatus={src, NetID, Signi (src||NetID)}, where Signi (src||NetID) represents a signature obtained by $N_i$ using its private key and splicing the src and the NetID as an input;

verifying by the $Node_i$, a signature in the network status with a public key of the network node $N_i$, or a marking in the network status with a symmetric key shared between the global network node $Node_i$ and the network node $N_i$, continuing to broadcast the network status to the remaining global network nodes in response to the signature being correct and discarding the network status in response to the signature being wrong; and recording by the $Node_i$, the network status in the DNTS through a consensus algorithm, and determining the authenticity of the src in the network status by querying a set of address prefixes of an AS to which the $Node_i$ belongs;

in a network forwarding process of the data packet, performing collaborative sampling on the data packet and performing credibility verification on related routing behaviors, comprising:

sampling by the $N_i$, information of the data packet and related routing behaviors of adjacent network nodes, wherein the related routing behaviors include one or more of discarding a message, tampering a message, and illegally modifying a forwarding path of a message; and in response to the data packet reaching a destination end, determining a security degree of the data packet by querying whether behaviors of both the source end and network nodes along the forwarding path in the DNTS are abnormal;

wherein determining the authenticity of the src in the network status comprises:

determining that the src in the data packet is authentic in response to the src belonging to the set of address prefixes, and determining that the src in the data packet is not authentic in response to the src not belonging to the set of address prefixes.

2. The method of claim 1, further comprising:
creating the DNTS through direct or indirect connections of the global network nodes in the plurality of autonomous domains in the network.

3. The method of claim 2, wherein performing by the distributed network node authenticity verification on the source address and the identity of the data packet comprises:
sampling by the $N_i$, the src and/or the NetID and/or an encrypted identifier embedded in the message, and uploading the src and/or the NetID and/or the encrypted identifier in a form of a network status NetStatus to the $Node_i$.

4. The method of claim 1, further comprising:
uploading by the Ni, the sampled information of the data packet to the $Node_i$, so that the $Node_i$ recalculates a signature in the sampled information with the public key of the $N_i$ to obtain a recalculated value;
continuing to broadcast the sampled information to the remaining globe network nodes in response to the recalculated value equal to the signature in the sampled information;
determining abnormal network behaviors by analyzing the sampled information with artificial intelligence and locating malicious network nodes; and
automatically sending a security alarm caused by the abnormal network behaviors to various network nodes, in which the security alarm comprises an address and an AS of the malicious network node, and a type of the abnormal network behavior.

5. The method of claim 1, wherein determining the security degree of the packet comprises:
reading an actual forwarding path from the data packet;
querying a desired forwarding path from the DNTS for the data packet; and
receiving the data packet in response to the actual forwarding path being equal to the desired forwarding path, and filtering the data packet in response to the actual forwarding path being not equal to the desired forwarding path.

6. A security guarantee apparatus for a full life cycle of a packet, applicable to a decentralized network trust system (DNTS) created by global network nodes for a plurality of autonomous domains (ASs), the plurality of ASs are connected in a blockchain, comprising:
a processor, and
a memory having instructions stored thereon and executable by the processor;
wherein the processor is configured to:
in response to the data packet generated at a communication source, perform authenticity verification on a source address and an identity of the data packet, comprising:
sampling by a network node $N_i$, a source address src and a network identity NetID in the data packet, verifying by the network node $N_i$, the source address and a forwarding path with a public key of the communication source or a symmetric key shared between the communication source and the network node $N_i$, and uploading a network status to the global network nodes $Node_i$, wherein as the network status is expressed NetStatus={src, NetID, Signi (src∥NetID)}, where Signi (src∥NetID) represents a signature obtained by $N_i$ using its private key and splicing the src and the NetID as an input,
verifying by the $Node_i$, a signature with a public key of the network node $N_i$ or a marking in the network status with a symmetric key shared between the global network node Nodei and the network node $N_i$, continuing to broadcast the network status to the remaining global network nodes in response to the signature being correct, discarding the network status in response to the signature being wrong, and
recording by the $Node_i$, the network status in the DNTS through a consensus algorithm, and determining the authenticity of the src in the network status by querying a set of address prefixes of an AS to which the $Node_i$ belongs;
in a network forwarding process of the data packet, perform collaborative sampling on the data packet and perform credibility verification on related routing behaviors, comprising:
sampling by the $N_i$, information of the data packet and related routing behaviors of adjacent network nodes, wherein the related routing behaviors include one or more of discarding a message, tampering a message, and illegally modifying a forwarding path of a message; and
in response to the data packet reaching a destination end, determine a security degree of the data packet by querying whether behaviors of both the source end and network nodes along the forwarding path in the DNTS are abnormal;
wherein the processor is further configured to:
determine that the src in the data packet is authentic in response to the src belonging to the set of address prefixes, and determine that the src in the data packet is not authentic in response to the src not belonging to the set of address prefixes.

7. The apparatus of claim 6, wherein the processor is further configured to:
create the DNTS through direct or indirect connections of the global network nodes in the plurality of ASs in the network.

8. The apparatus of claim 7, wherein the processor is further configured to sample by the $N_i$, the src and/or the NetID and/or an encrypted identifier embedded in the message, and uploading the src and/or the NetID and/or the encrypted identifier in a form of a network status NetStatus to the global network node $Node_i$.

9. The apparatus of claim 7, wherein the processor is further configured to:
upload by the $N_i$, the sampled information of the data packet to the $Node_i$, so that the $Node_i$ recalculates a signature in the sampled information with the public key of the $N_i$ to obtain a recalculated value;
continue to broadcast the sampled information to the remaining globe network nodes in response to the recalculated value equal to the signature in the sampled information;
determine abnormal network behaviors by analyzing the sampled information with artificial intelligence and locating malicious network nodes; and
automatically send a security alarm caused by the abnormal network behaviors to various network nodes, in which the security alarm comprises an address and AS of the malicious network node, and a type of the abnormal network behavior.

10. The apparatus of claim 6, wherein the processor is further configured to:
- read an actual forwarding path from the data packet;
- query a desired forwarding path from the DNTS for the data packet; and
- receive the data packet in response to the actual forwarding path being equal to the desired forwarding path, and filtering the data packet in response to the actual forwarding path being not equal to the desired forwarding path.

11. A decentralized network trust system (DNTS), comprising:
- a plurality of autonomous domains (ASs) connected in a blockchain, each of the ASs having a plurality of global network nodes $Node_i$;
- a network node $N_i$, configured to:
  - sample a source address src and a network identity NetID in the data packet, verify the source address and a forwarding path with a public key of the communication source or a symmetric key shared between the communication source and the network node $N_i$, and upload a network status to the global network node $Node_i$, wherein the network status is expressed as NetStatus={src, NetID, Signi (src-||NetID)}, where Signi (src||NetID) represents a signature obtained by $N_i$ using its private key and splicing the src and the NetID as an input; and
  - sample information of the data packet and related routing behaviors of adjacent network nodes, wherein the related routing behaviors include one or more of discarding a message, tamper a message, and illegally modify a forwarding path of a message;
- the global network nodes Nodei, configured to:
  - verify a signature in the network status with a public key of the network node $N^i$, or a marking in the network status with a symmetric key shared between the global network node Nodei and the network node Ni, continue to broadcast the network status to the remaining global network nodes in response to the signature being correct and discarding the network status in response to the signature being wrong;
  - record the network status in the DNTS through a consensus algorithm, and determine the authenticity of the src in the network status by querying a set of address prefixes of an AS to which the global network node Nodei belongs;
- a communication source end configured to generate a data packet; and
- a destination end configured to determine a security degree of the data packet by querying whether behaviors of both the source end and network nodes along the forwarding path in the DNTS are abnormal;
- wherein the network node $N_i$ is further configured to determine that the src in the data packet is authentic in response to the src belonging to the set of address prefixes, and determine that the src in the data packet is not authentic in response to the src not belonging to the set of address prefixes.

12. The system of claim 11, wherein the DNTS is created by directly or indirectly connecting the global network nodes in the plurality of ASs in the network.

13. The system of claim 12, wherein the network node Ni is further configured to: sample the src and/or the NetID and/or an encrypted identifier embedded in the message, and upload the src and/or the NetID and/or the encrypted identifier in a form of a network status NetStatus to the global network node $Node_i$.

* * * * *